United States Patent
Van Der Merwe et al.

(10) Patent No.: US 8,352,801 B2
(45) Date of Patent: *Jan. 8, 2013

(54) SYSTEMS, METHODS, AND APPARATUS TO DEBUG A NETWORK APPLICATION BY UTILIZING A CLONED NETWORK AND AN INTERACTIVE DEBUGGING TECHNIQUE

(75) Inventors: Jacobus Van Der Merwe, New Providence, NJ (US); Matthew Chapman Caesar, Urbana, IL (US); Chia-Chi Lin, Urbana, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/542,329

(22) Filed: Jul. 5, 2012

(65) Prior Publication Data

US 2012/0284699 A1 Nov. 8, 2012

Related U.S. Application Data

(63) Continuation of application No. 12/647,140, filed on Dec. 24, 2009, now Pat. No. 8,245,083.

(51) Int. Cl.
*G06F 11/00* (2006.01)
*G06F 11/14* (2006.01)
(52) U.S. Cl. ............... 714/45; 714/25; 703/21; 717/124
(58) Field of Classification Search ............ 714/25, 714/43, 45; 703/21; 717/124, 127
See application file for complete search history.

(56) References Cited

U.S. PATENT DOCUMENTS

| | | | |
|---|---|---|---|
| 5,436,909 A | 7/1995 | Dev et al. | |
| 6,317,844 B1 | 11/2001 | Kleiman | |
| 6,636,898 B1 | 10/2003 | Ludovici et al. | |
| 7,065,674 B2 | 6/2006 | Cabrera et al. | |
| 7,107,578 B1 | 9/2006 | Alpern | |
| 7,249,174 B2 | 7/2007 | Srinivasa et al. | |
| 7,289,964 B1 | 10/2007 | Bowman-Amuah | |
| 7,409,577 B2 | 8/2008 | Wing et al. | |
| 7,428,664 B2 | 9/2008 | Sirbu | |
| 7,533,289 B1 | 5/2009 | Castillo et al. | |
| 7,610,511 B2 | 10/2009 | Fujita et al. | |
| 7,613,749 B2 | 11/2009 | Flynn, Jr. et al. | |
| 7,809,976 B2 | 10/2010 | Goodson et al. | |
| 2004/0111502 A1 | 6/2004 | Oates | |
| 2005/0273667 A1 | 12/2005 | Shrivastava et al. | |
| 2006/0143359 A1 | 6/2006 | Dostert et al. | |
| 2007/0043971 A1 | 2/2007 | Suzuki | |
| 2007/0113218 A1 | 5/2007 | Nolan et al. | |

(Continued)

OTHER PUBLICATIONS

ReVirt: Enabling Intrusion Analysis through Virtual-Machine Logging and Replay by Dunlap et al. Dec. 2002.

(Continued)

*Primary Examiner* — Joseph Schell
(74) *Attorney, Agent, or Firm* — Toler Law Group, PC

(57) ABSTRACT

A method includes instantiating a cloned network that includes a second set of virtual service nodes. The second set of virtual service nodes includes at least one cloned virtual service node that is a clone of a corresponding virtual service node in a first set of virtual service nodes. The at least one cloned virtual service node has access to a history of events that occurred at the corresponding virtual service node in the first set of virtual service nodes. The method includes initiating an interactive debugging session that includes step by step processing of the events of the history of events.

20 Claims, 10 Drawing Sheets

U.S. PATENT DOCUMENTS

| | | |
|---|---|---|
| 2007/0280243 A1 | 12/2007 | Wray et al. |
| 2008/0244535 A1 | 10/2008 | Nelson et al. |
| 2009/0320010 A1 | 12/2009 | Chow et al. |
| 2010/0107158 A1 | 4/2010 | Chen et al. |
| 2011/0161730 A1 | 6/2011 | Van Der Merwe et al. |

OTHER PUBLICATIONS

Feamster et al., "Detecting BGP Configuration Faults with Static Analysis," MIT Computer Science and Artificial Intelligence Laboratory, May 2005, 14 pages.

Ports et al., "Canopy: A Controlled Emulation Environment for Network System Experimentation," Dec. 15, 2005, 10 pages.

Gilmore et al., "GDB Internals: A guide to the internals of the GNU debugger," Cygnus Solutions, Free Software Foundation, Inc., Copyright 1990-1999, 47 pages.

Newman, "Software Errors Cost U.S. Economy $59.5 Billion Annually, "National Institute of Standards and Technology News Release, Jun. 28, 2002, retrieved from nist.gov/public_affairs/.../n02-10.htm, 3 pages.

Alimi et al., "Shadow Configuration as a Network Management Primitive,"SIGCOMM 08, Aug. 17-22, 2008, Seattle, WA, USA, 12 pages.

Fonseca et al., "X-Trace: A Pervasive Network Tracing Framework, "USENIX Symposium on Networked Systems Design and Implementation, Apr. 2007, 14 pages.

Fox et al., "Parallel Computer Works, "Table of Conents and Chapterf 5.3: Parallel Debugging, Morgan Kaufmann Publishers, Inc. 1994 (30 pages).

Lakhina et al., "Diagnosing Network-Wide Traffic Anomalies, "SIGCOMM '04, Aug. 30-Sep. 3, 2004, Portland, OR, USA, 12 pages.

Rajendran et al., "Theoretical Bounds on Control-Plane Self-Monitoring in Routing Protocols," Columbia University Computer Science and Tech Report, Jun. 2007, 12 pages.

Roberts, "Cisco Tries to Quash Vulnerability Talk a Black Hat, " EWEEK, Jul. 27, 2005, 3 pages.

Wang et al., "Virtual Routers on the Move: Live Router Migration as a Network-Management Primitive, " SIGCOMM '08, Aug. 17-22, 2008, Seattle, WA, USA, 12 pages.

"Coverity Static Analysis, " retrieved from www.coverity.com, 4 pages.

"Parallel Environment for Linux V4/3 Operation and Use," retrieved from http://publib.boulder.ibm.com/infocenter/clresctr/vxrx/topic/com.ibm.cluster.pe_linux43.opuse.doc/am102_pdbman.html, Jul. 2009, 3 pages.

Duffy, "BCP bug bites Juniper software, "from http://www.networkworld.com/news/2007/121807-bgp-juniper-junos.html, Network World, Dec. 18, 2007, 1 page.

Ho et al., "PDB: Pervasive Debugging with Xen, "University of Cambridge, England, 2004, 6 pages.

Maruyama et al., "Parallel Program Debugging Based on Data-Replay, " vol. 46, No. SIG 12 (ACS11), Aug. 2005, pp. 214-224 (11 pages). Translation of abstract only.

Satoru et al., "A debugger with both roll back mechanism and file operations, " John Shori Gakkai Kenkyu Hokoku, vol. 2003, No. 42, pp. 143-146, only translation of abstract provided, 1 page.

Bush et al., "Route Flap Damping: Harmful?," RIPE/Rodos, Sep. 10, 2009, 12 pages.

Lu et al., "AVIO: Detecting Atomicity Violations via Access Interleaving Invariants, " ASPLOS '06, Oct. 21-25, 2006, San Jose, CA, USA, 12 pages.

McDowell et al., "Debugging Concurrent Programs,"ACM Computing Surveys, vol. 21, No. 4, Dec. 1989, 30 pages.

Lynch, "Distributed Algorithms, "Table of Contents retrieved on Jun. 6, 2010 from http://www.elsevier.com/wps/find/bookdescription.cws_home/677793/description, 8 pages.

Non-Final Office Action for U.S. Appl. No. 12/647,140 received from the United States Patent and Trademark Office (USPTO) mailed Mar. 29, 2011, 20 pages.

Final Office Action for U.S. Appl. No. 12/647,140 received from the United States Patent and Trademark Office (USPTO) mailed Dec. 21, 2011, 17 pages.

Notice of Allowance for U.S. Appl. No. 12/647,140 received from the United States Patent and Trademark Office (USPTO) mailed Apr. 4, 2012, 30 pages.

400 ⟶ live_receive(pkt)
1: history.insert(pkt)
2: if history.back() != pkt then
3:    rollback(history, pkt)
4: else
5:    deliver(pkt)
6:    history.update(pkt)
7: end if

508 ⇘ rollback(history, pkt)
1: for all tpkt ∈ [ history.back(), history.search(pkt) ) do
2:    history.search(tpkt).restore()
3:    history.search(tpkt).cleanup()
4: end for
5: for all tpkt ∈ [ history.search(pkt), history.back() ] do
6:    live_receive(tpkt)
7: end for

```
cleanup(pkt)
 1: for all tpkt ∈ [ history.back(), history.search(pkt) ] do
 2:     history.search(tpkt).restore()
 3:     history.search(tpkt).cleanup()
 4: end for
 5: for all tpkt ∈ ( history.search(pkt), history.back() ] do
 6:     live_receive(tpkt)
 7: end for
```

EVENT HISTORY

SYSTEMS, METHODS, AND APPARATUS TO DEBUG A NETWORK APPLICATION BY UTILIZING A CLONED NETWORK AND AN INTERACTIVE DEBUGGING TECHNIQUE

CLAIM OF PRIORITY

This application is a continuation patent application of, and claims priority from, U.S. patent application Ser. No. 12/647,140, filed on Dec. 24, 2009 now U.S. Pat. No. 8,245,083 and entitled "SYSTEMS, METHODS, AND APPARATUS TO DEBUG A NETWORK APPLICATION," which is hereby incorporated by reference in its entirety.

FIELD OF THE DISCLOSURE

This disclosure relates generally to networks and, more particularly, to methods and apparatus to debug a network application.

BACKGROUND

Debugging large scale systems has been attempted using fully-automated systems, such as systems that check the behavior of a system against an ideal model of the system. However, while some problems may be identified using automated systems, fully modeling the logic of a complex protocol requires a complex model, which can increase the probability of bugs in the model. Complex models may also have difficulty with boundaries between simulated code modules, ossification of legacy code, privacy or trade secret issues (e.g., when the software developer and the debugger belong to different institutions or organizations), and scaling issues. Fully automated models often detect problems without determining the root cause of the problem or how the problem may be repaired. Additionally, fully automated models tend to have difficulty identifying logical or semantic errors, such as may exist in source code.

DETAILED DESCRIPTION

Figure 1:
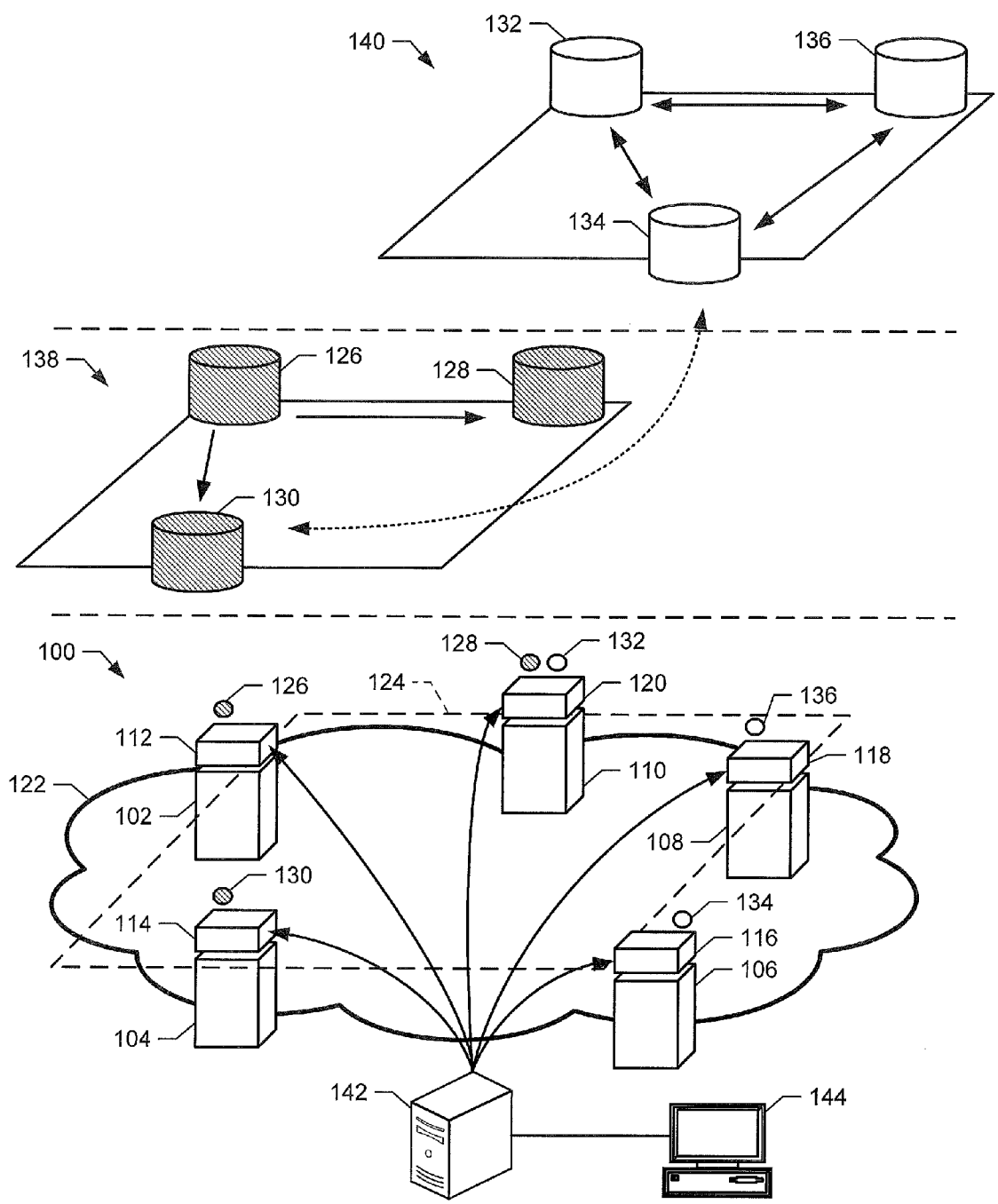
FIG. 1 illustrates an example communications system that may run a network application and implemented using physical network nodes and virtual service platforms.

Certain examples are shown in the above-identified figures and described in detail below. In describing these examples, like or identical reference numbers may be used to identify similar elements. The figures are not necessarily to scale and certain features and certain views of the figures may be shown exaggerated in scale or in schematic for clarity and/or conciseness. Although the following discloses example methods, apparatus, and articles of manufacture, it should be noted that such methods, apparatus, and articles of manufacture are merely illustrative and should not be considered as limiting. Accordingly, while the following describes example methods, apparatus, and articles of manufacture, the examples are not the only way to implement such methods, apparatus, and articles of manufacture.

The example methods and apparatus described below may be used to debug an application that runs on a communications network. In some respects, the Internet may be thought of as a very complex distributed software infrastructure. The complexity of software that is used to implement the Internet causes the software to suffer from defects introduced by, among other things, human coding error. Network service and equipment developers introduce bugs and vulnerabilities into network software and/or operators may misconfigure equipment, any of which can cause adverse effects and outages in the network and result in higher operating costs.

In contrast to conventional debugging systems, example methods and apparatus described herein utilize a human network operator and one or more cloned nodes to diagnose a network application bug or error. The example methods and apparatus may clone one or more nodes in a network to attempt to reproduce error(s) in a network application. Using the cloned nodes, the network operator may interactively step through execution of the application and evaluate the state of the network at different times to identify error(s).

Reproducibility of a network error assists the network operator in determining the problem. Some network errors may be relatively rare, and causing the network operator to wait for the error to occur in the live network may be very time-consuming and expensive. The example methods and apparatus allow a network operator to reproduce a network error to identify the root cause of a problem and/or to attempt different repair solutions.

Typical communications networks operate in a highly random manner. At a high level, messages (e.g., control messages) are not received and transmitted over the network in a predictable manner and, thus, reproducing typical network activity for debugging purposes is very difficult, if not impossible. Alternatively, every message exchanged within the network may be stored in the order in which it was received by a particular node, which may require a very large amount of storage. The example methods and apparatus cause a live network (i.e., a production network serving clients in real-time) to exchange and process messages in a pseudorandom manner. In some examples, the messages are processed in a pseudorandom manner according to a processing order that would be likely to occur without a defined processing order. When processing the messages, if the actual processing order results in a violation of the intended processing order, the network is rolled back to an earlier state to correctly order the processing of messages as described in more detail below.

In some examples, cloned nodes are instantiated based on the live network to debug a network application. The cloned nodes operate on a virtual plane using the same or similar physical network equipment as the live network. When the network operator is troubleshooting a network error, the network operator instantiates a clone that runs on one or more of the physical network nodes as the portion of the live network being cloned and/or one or more additional nodes. The nodes in the cloned network operate in lockstep by transmitting or exchanging messages during a first time (e.g., a transmitting phase) and processing received messages during a second time (e.g., a processing phase). The exchanging and processing phases are repeated until the system reaches a breakpoint, at which time execution of the cloned network is paused to allow the network operator to evaluate the state of the network.

The ordering of the messages that are transmitted and processed by the cloned network is the same or substantially the same as the packet ordering that is enforced by the live network during operation of the live network. Thus, the packet ordering enforced on the live network enables any cloned networks based on the live network to replicate the processing of packets or messages. By virtualizing the live network and the cloned network(s), a physical network node can support both a live network node and one or more cloned network nodes. When the network error is detected and repaired, the network operator may merge the repair back into the live network.

FIG. 1 illustrates an example communications system 100 that runs one or more network applications and is implemented using physical network nodes 102-110 and virtual service coordinators (VSCs) 112-120. The physical network nodes 102-110 are physically interconnected, directly or indirectly, via a communication network 122. The example VSCs 112-120 are logically interconnected via the communication network 122 and provide an abstraction of a hosting environment for network software such as, for example, backbone network routing software.

The VSCs 112-120 coordinate and manage a number of virtual service nodes (VSNs) 126-136. The VSNs 126-136 are logically decoupled from the respective physical network nodes 102-110, and instead run via a virtual service hypervisor 124. The hypervisor 124 is illustrated as a control plane to manage network and computational resources across the VSNs 126-136.

In the example of FIG. 1, the VSNs 126-130 belong to a first virtual service platform (VSP) 138 and the VSNs 132-136 belong to a second VSP 140. VSNs 126-136 may be cloned from other VSNs 126-136 and/or from virtual nodes in the live network. In this example, the VSP 138 is operated as a live (or production) network to provide customers with network services and to enable debugging of network application errors. The VSP 140 may be cloned from the VSP 138 as described below when a network error is detected to assist an operator in debugging the error. When a network error has been corrected, changes to the VSNs 126-136 may be merged back into the live network to accomplish the correction. Cloning, debugging, and merging are discussed in further detail below.

In the illustrated example, the first VSP 138 is operated as a live communication network VSP to serve and route data requests between end users. The VSNs 126-130 are logically decoupled from the underlying hardware of the respective physical network nodes 102, 104, and 110, and are controlled via the respective VSCs 112, 114, and 120. In other words, the VSNs 126-130 run as virtual routers or servers. Thus, the VSCs 112-120 may instantiate and control resources to multiple VSNs 126-136 on a single physical network node 102-110. For example, the VSC 120, running on the physical network node 110, has instantiated two VSNs 128 and 132. As described in more detail below, the VSC 120 controls the resources available to each of the VSNs 128 and 132. For example, the VSC 120 may provide most resources to the VSN 128 to ensure sufficient computational resources are available to the live network (i.e., the first virtual network 138) and provide resources to the VSN 132 as needed to complete debugging tasks.

The second example VSP 140 is operated as a clone of all or a portion of the first virtual network 138 to troubleshoot a network application error. As mentioned above, the VSNs 132-136 of the second virtual network 140 may be cloned from VSNs 126-130 in the live network 138 and/or from other cloned VSNs. To enable troubleshooting, the example communication system 100 includes a debugging coordinator 142 and a user terminal 144. The example debugging coordinator 142 coordinates the runtime operation of cloned VSNs (e.g., 132-136) in the communications network 122. The debugging coordinator 142 further accepts debugging commands (e.g., to insert breakpoints into processing of network messages, to print the state of the network 122 and/or one or more VSNs 126-136, or to manipulate processing of messages in the VSNs 126-136) from a network operator via the user terminal 144. A more detailed description of the debugging coordinator 142 is provided below.

Figure 2:
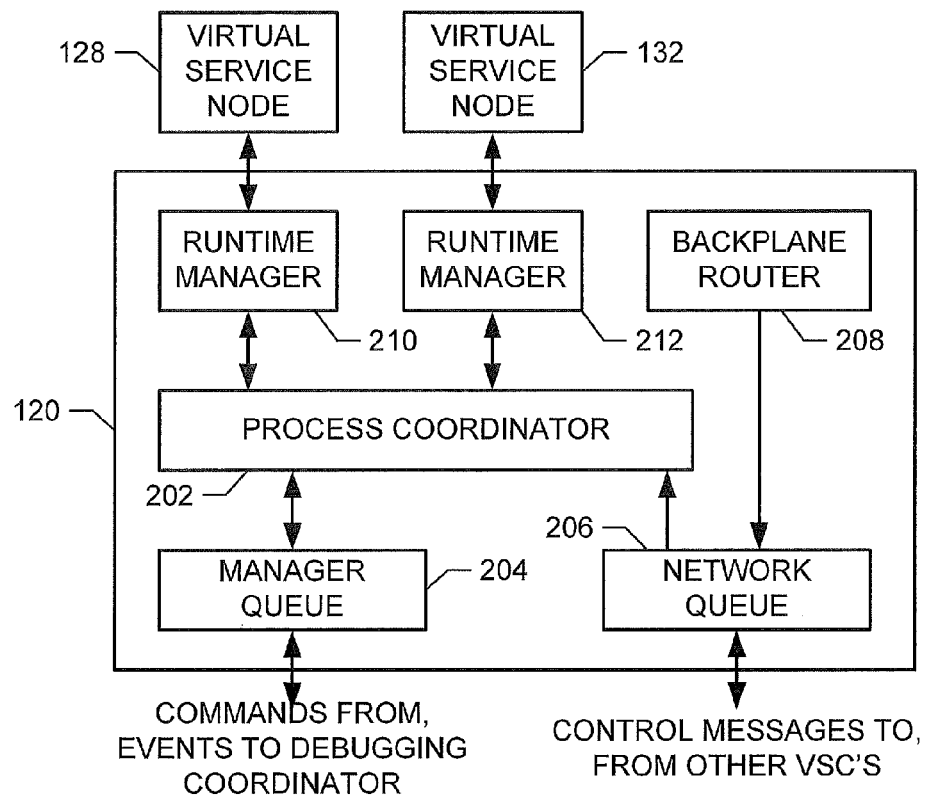
FIG. 2 is a block diagram illustrating an example virtual service coordinator that may be used to manage one or more virtual service nodes.

FIG. 2 is a block diagram illustrating an example implementation of a VSC (e.g., VSC 120) to manage one or more VSNs (e.g., 128 and 132). Although FIG. 2 is generic to any of the VSCs, for each of nomenclature it will be referred to as VSC 120 in the following discussion. The example VSC 120 includes a process coordinator 202, a manager queue 204, a network queue 206, and a backplane router 208. The example VSC 120 also instantiates runtime managers 210 and 212 corresponding to the VSNs 128 and 132, respectively.

The process coordinator 202 determines which events the VSC 120 will provide to a debugging coordinator (e.g., the debugging coordinator 142 of FIG. 1). For example, the process coordinator 202 may filter out events that are not likely to have any influence on the current network error being investigated by the debugging coordinator 142 and the network operator at the network terminal 144. The filtered events may be defined and/or updated by manual input or from a standing list of events. Additionally, the process coordinator 202 may retrieve messages and/or commands from the manager queue and/or the network queue, and deliver messages and/or commands to the manager queue 204 and/or the network queue 206 in response to commands received from the debugging coordinator 142.

The manager queue 204 receives the events that are not filtered out by the process coordinator 202 and delivers the received events to the debugging coordinator 142. The events (e.g., a condition triggering a breakpoint) may then be used by a network operator to evaluate the state of the communications network 122. The manager queue 204 also receives commands from the debugging coordinator 142. Example commands may include establishing and/or removing breakpoints, pausing processing of messages, rolling back the state of the network, reprocessing of messages (i.e., replay), and/or processing speed change (e.g., speed up, slow down). Additional example commands may include lockstep commands (e.g., transmission phase, processing phase), which cause the VSC 120 to run the VSNs (e.g., 132-136) on a VSP (e.g., 140) in synchronization. A breakpoint, as used herein, may refer to any time or event specified by a network operator. A breakpoint may be, but need not be, representative of a network error or failure.

When it is desirable to cause the VSNs 132-136 on a VSP 140 to transmit messages waiting in the respective network queues 206 to recipient VSNs 132-136, a transmission phase command is issued by the debugging coordinator 142. The recipient VSNs 132-136 then store the received messages in the respective receiving network queues 206. When it is desirable to cause the VSNs 132-136 to process the messages that are stored in the network queues 206 that were received during the transmission phase, a processing phase command is then issued. The processing phase may also include generating messages for transmission during the next transmission phase. After the processing phase is completed by all VSNs 132-136 on the VSP 140, the debugging coordinator, if desired, transmits the next transmission phase command. The transmission phase/processing phase cycle may iterate until, for example, a breakpoint condition is reached or until a network operator wishes to inspect the state of the VSP 140. By issuing transmitting and/or processing phase commands, an operator is able to step through different state of the network, modeled by the VSNs modeling the live network, to thereby analyze and/or debug the network.

As mentioned above, the network queue 206 queues messages that are input for delivery to a destination VSN (e.g., during a transmission phase) and queues messages that are generated for output to other VSNs 126-136 (e.g., during a processing phase). The process coordinator 202 pushes messages to and/or pulls messages from the network queue 206 in response to lockstep or other commands from the debugging coordinator 142.

The backplane router 208 determines and/or constructs routes via a separate virtual network that is isolated from the VSNs that are used for debugging (e.g., the VSNs 132-136). As a result, the VSC 120 and the debugging coordinator 142 will maintain a routing path for commands and messages and that routing path will not be broken by actions occurring during debugging.

The runtime managers 210 and 212 control the execution of the VSNs 128 and 132 by speeding up or slowing down processing of messages, reversing or replaying previous messages and/or commands, and/or pausing processing to allow a network operator to view a fixed state of the corresponding VSP 138 or 140. The runtime managers 210 and 212 may control execution by, for example, controlling access by the VSNs 128 and 132 to processing resources of the underlying physical network node 110. If the VSC 120 instantiates an additional VSN, the VSC 120 will also instantiate a corresponding runtime manager. In contrast, if the VSC 120 merges the VSN 132 into the VSN 128 (e.g., to implement a corrective network action), the runtime manager 212 may be eliminated.

Because the VSCs 112-120 operate via the hypervisor 124 (e.g., a control plane), traffic along a data plane (e.g., user or customer traffic) that is serviced by the VSNs 126-130 in the live network 138 is not affected by rolling back the live network to enforce the packet ordering. For example, rolling back the live network 138 may change the firmware version of one or more VSCs 112-120, may change one or more settings of the runtime managers 210 and 212, may change data tables or other data structures of the VSCs 112-120, or may change other settings or features that do not substantially affect operation of the VSNs 126-130.

Figure 3:
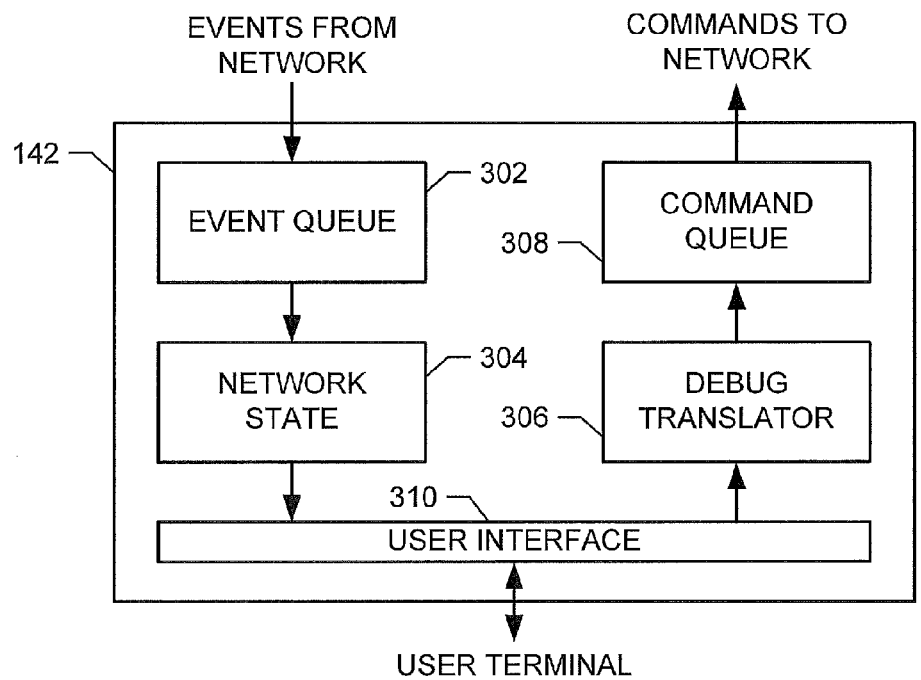
FIG. 3 is a block diagram of an example debugging coordinator to enable a network operator to debug a network application.

FIG. 3 is a more detailed block diagram of the example debugging coordinator 142 of FIG. 1. The debugging coordinator 142 enables a network operator to debug a network application. The example debugging coordinator 142 of FIG. 3 includes an event queue 302, a command queue 304, a network state 306, a debug translator 308, and a user interface 310.

The example event queue 302 receives events from the network (e.g., from the VSCs 112-120, from the VSNs 126-136, etc.). Example events may include notifications from the VSCs 112-120 when a new control packet is sent or when the forwarding table of a VSN 126-136 or VSC 112-120 is updated.

The network state 304 is determined and built based on the events received from the event queue 302. A network operator who is debugging a network application may view the network state at any time during the debugging process. The network state 304 may represent the network at any number of levels of abstraction. For example, the network state 304 may allow the user to view an entire VSP 138 or 140 all the way down to particular configuration details of a particular VSN 126-136.

The example network state 304 is built by examining a log of network-level events. By processing the events in a deterministic, pseudorandom order, the state of the network at a particular time may be determined and provided to the user. As described in more detail below, the processing of the events may be incorrectly ordered, but the order may be corrected by rolling back the network state 304 and correctly processing the events.

The debug translator 306 receives debug commands from the network operator (e.g., via the terminal 144 of FIG. 1 and the user interface 310). To correctly provide the debug commands to the VSCs 112-120, the debug translator 306 determines which VSCs 112-120 are to implement the command and translates the debug commands accordingly. For example, the debug translator 306 may generate machine-level commands for packaging into a network packet that is then transmitted to the appropriate VSCs 112-120 for execution.

In some examples, if the network operator wishes to place a breakpoint where the VSN 132 loses communication with the VSN 134, the debug translator 306 receives the breakpoint command and arguments, and translates the command into one or more commands that are understandable by the VSNs 132 and 134. If the underlying physical network nodes 106 and 110 and/or the VSCs 116 and 120 have different implementations, the debug translator 306 translates the command into different messages suitable for the different physical nodes 106 and 110 and/or VSCs 116 and 120. The translated commands are then packaged for delivery to the VSCs 116 and 120. When the VSN 132 loses communication with the VSN 134 (i.e., the VSP 140 reaches the specified breakpoint condition), the event queue 302 receives an event from the corresponding VSCs 116 and/or 120.

The command queue 308 receives commands destined for the VSCs 112-120 to control debugging and forwards the commands to the appropriate VSCs 112-120. The command queue 308 may use the live network (e.g., the VSP 138) to route the packets to the VSCs 112-120. In some cases, the command queue 308 may determine that the backplane route must be used to reach one or more of the VSCs 112-120 if, for example, a VSC 120 to receive a command has become unreachable via the VSP 138 due to debugging activities.

The user interface 310 accepts commands from a network operator who is debugging a network application. The user interface 310 may be communicatively coupled to the user terminal 144 of FIG. 1. In some other examples, the user interface 310 may include the user terminal 144.

To illustrate operation of the example system 100 of FIG. 1, consider the following example of operation. This example is by no means limiting. In the example of operation, a network operator of an Internet service provider (ISP) receives a phone call from a customer served by the communication system 100 and, more specifically, the VSP 138 including the VSNs 126-130. The customer reports that the customer's Internet connectivity appears to fail at random times, and that a large outage occurred the previous night. To diagnose the problem, the network operator, via the user terminal 144, connects to the debug coordinator 142.

The network operator creates a cloned instance of the live network by cloning the VSNs 126-130 in the VSP 138 to create the VSNs 132-136 in the VSP 140. To create the cloned instances of the VSNs 132-136, the debugging coordinator 142 receives a command from the user terminal 144 via the user interface 310. The debug translator 306 generates the clone commands into hardware and/or software-specific instructions and/or packets. The command queue 308 queues the packets generated by the debug translator 308 and transmits the packets to the appropriate VSCs (e.g., the VSCs 116-120).

Upon receiving the packet(s) via the manager queue 204, the process coordinator 202 of the VSC 116 instantiates a new runtime manager 212 to handle a newly-instantiated VSN 132. The VSCs 118 and 120 instantiate new VSNs 134 and 136, respectively, in the same manner. The cloned VSNs 132-136 have the same characteristics as the respective ones of the VSNs 126-130. The state of the newly-instantiated VSNs 132-136 may be based on the most recent checkpoint prior to the reported problem where the VSNs 126-130 were known (or at least believed) to be in an acceptable state. However, the debugging coordinator 142 may simulate any interaction that would occur between the VSNs 126-130 and other parts of the network 122 using the cloned VNS 132-136.

As illustrated in FIG. 1, the VSNs 134-136 are instantiated on a different set of physical network nodes 106-108 and VSCs 116-118 than the VSNs 126 and 130. The VSC 120 supports multiple VSNs corresponding to different VSPs 138 and 140. Alternatively, the network operator may choose to instantiate all of the cloned VSNs 132-136 on the same set of physical network nodes 102-106 as the corresponding VSNs 126-130.

The network operator sets a breakpoint on one or more of the cloned VSNs 132-136 that is triggered when the route between the customer and the VSP 140 becomes unavailable. The operator then instructs the debugging coordinator 142 via the user interface 310 to run the cloned instance using events and/or messages occurring after the checkpoint. To run the cloned instance, the debugging coordinator 142 generates a series of commands via the debug translator 306 and the command queue 308 to alternate the VSCs 116-120 between a processing phase and a transmitting phase. While the debugging coordinator 142 is generating commands, the event queue 302 and the network state 304 are monitored for messages from the network queues 206 of the VSCs 116-120 to determine whether the specified breakpoint has been reached. When the route between the customer and the VSP 140 becomes unavailable (i.e., the breakpoint is reached), the cloned instance is paused, and the network operator may query the network and/or print to view the network state 304 at the breakpoint. Continuing with this example of operation, the network operator determines from the network state 304 that the routing path between the customer and the VSP 140 changed because a withdrawal message was received at the VSN 132 from the VSN 134.

To determine the cause of the withdrawal message, the network operator places a different breakpoint at the creation of the withdrawal message at the VSN 134 and re-runs the cloned instance from the checkpoint or earlier. Because the messages exchanged between the VSNs 132-136 are deterministically and pseudorandomly ordered, the cloned instance runs the same way or substantially the same way each time. When the cloned instance reaches the new breakpoint, the network operator may query and/or print to view the network state 304.

The network operator repeats the process of setting an appropriate breakpoint and rerunning the cloned instance until the network operator localizes the problem to a particular cloned VSN 134 (corresponding to one of the live network VSNs 126-130). In this example of operation, the example cloned VSN 134 repeatedly sends updates even though the cloned VSN 134 does not receive new external messages. The network operator forms a hypothesis that the cloned VSN 134 has faulty software and changes the software to an earlier version by sending a message to the process coordinator of the VSC 116. To test the solution, the network operator runs the cloned network at high speed and injects artificial external messages into the cloned VSN 134. To run the cloned network at high speed, the runtime managers 210 and 212 of the cloned VSNs 132-136 receive commands from the process coordinators 202 and accelerate the speed at which the cloned VSNs 132-136 transmit and process messages. When the problem does not reoccur, the network operator merges the changes (i.e., the software changes) into the live network.

While an example manner of implementing the communications network 100 has been illustrated in FIG. 1, one or more of the elements, processes and/or devices illustrated in FIG. 1 may be combined, divided, re-arranged, omitted, eliminated and/or implemented in any other way. Further, the example network nodes 102-110, the example VSCs 112-120, the example VSNs 126-136, the example debugging coordinator 142, the example user terminal 144, the example process coordinator 202, the example manager queue 204, the example network queue 206, the example backplane router 208, the example runtime managers 210 and 212, the example event queue 302, the example network state 304, the example debug translator 306, the example command queue 308, the example user interface 310, and/or, more generally, the example communications network 100 of FIGS. 1-3 may be implemented by hardware, software, firmware and/or any combination of hardware, software and/or firmware. Thus, for example, any of the example network nodes 102-110, the example VSCs 112-120, the example VSNs 126-136, the example debugging coordinator 142, the example user terminal 144, the example process coordinator 202, the example manager queue 204, the example network queue 206, the example backplane router 208, the example runtime managers 210 and 212, the example event queue 302, the example network state 304, the example debug translator 306, the example command queue 308, the example user interface 310, and/or, more generally, the example communications network 100 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example network nodes 102-110, the example VSCs 112-120, the example VSNs 126-136, the example debugging coordinator 142, the example user terminal 144, the example process coordinator 202, the example manager queue 204, the example network queue 206, the example backplane router 208, the example runtime managers 210 and 212, the example event queue 302, the example network state 304, the example debug translator 306, the example command queue 308, and/or the example user interface 310 are hereby expressly defined to include a tangible medium such as a memory, DVD, CD, etc. storing the software and/or firmware. Further still, the example communications network 100 of FIG. 1 and/or the structures of FIGS. 2 and/or 3 may include one or more elements, processes and/or devices in addition to, or instead of, those illustrated in FIGS. 1-3, and/or may include more than one of any or all of the illustrated elements, processes and devices.

Figures 4, 5:
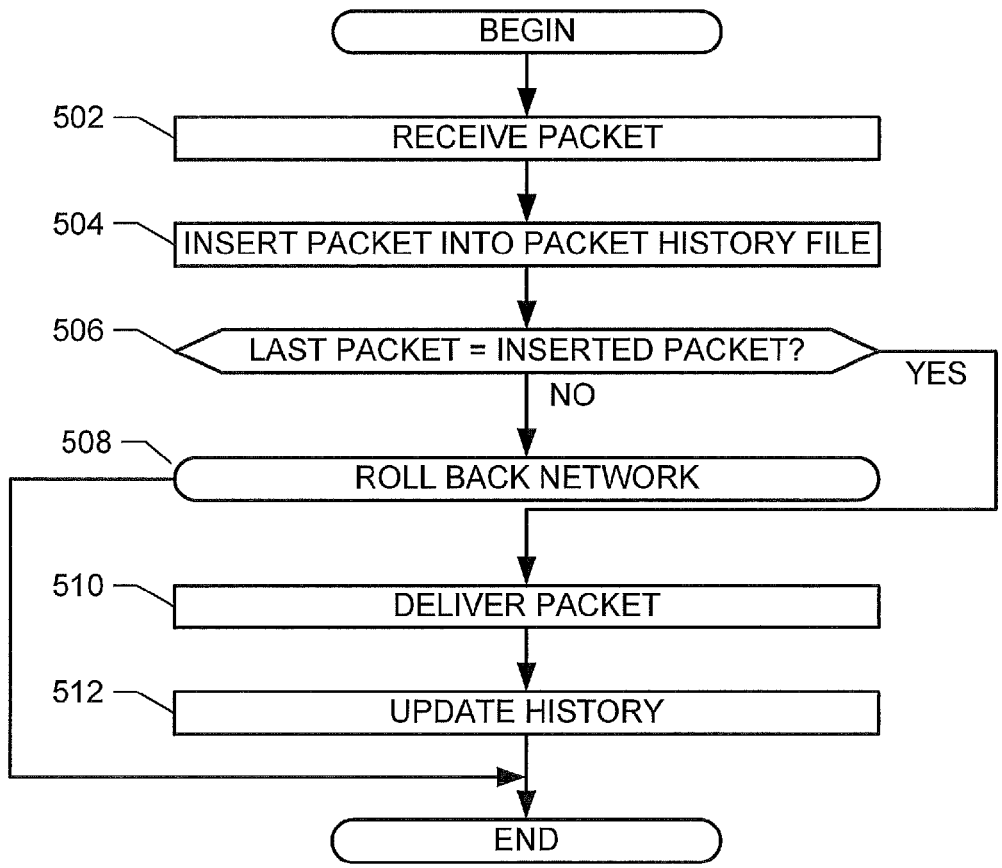
FIG. 4 illustrates pseudocode representative of example machine readable instructions that may be executed to implement the example process coordinator of FIG. 2 to implement pseudorandom ordering in a live network.
FIG. 5 is a flow diagram representative of example machine readable instructions, which may be executed to implement the example process coordinator of FIG. 2 to implement pseudorandom ordering in a live network.

FIG. 4 illustrates pseudocode representative of example machine readable instructions 400 that may be executed to implement pseudorandom ordering in a live network. The example instructions 400 of FIG. 4 are executed on the example VSCs 112-120 of FIG. 1 and, more particularly, to implement the VSNs 126-130 that are used to provide the live network VSP 138. By executing the example instructions 400, the example VSP 138 (e.g., the live network) enforces a packet ordering that allows the packets in the VSP 138 to be repeatedly processed according to the packet ordering when debugging is performed. The instructions 400 are executed when a VSN (e.g., the VSN 126) receives a packet (e.g., a network control layer packet). In some examples, the instructions 400 are only applied when control plane packets are received (as opposed to data plane packets).

The execution of the instructions 400 will be described in combination with FIG. 5, which is a flow diagram representative of the example machine readable instructions 400. When the example instructions 400 begin, the VSN 126 (running on VSC 112) receives a packet that acts as a call to live_receive having an input argument of the received packet pkt (block 502). For example, the runtime manager 210 may call live_receive in response to identifying a packet intended for the VSN 126. The VSC 112 inserts the packet pkt into a history file (block 504). The history file is ordered according to an ordering hierarchy that approximates the packet receipt ordering that is likely to occur in the network (e.g., due to network latencies). When a packet pkt is received at the history file, the history file is ordered to reflect the ordering hierarchy. The example VSC 112 then tests the packet pkt to determine whether the packet pkt obeys the ordering hierarchy by determining whether the packet pkt is the last packet in the history file (block 506). If the packet pkt is not the last packet in the history file (block 506), the ordering has been violated and the VSC 112 rolls back the network (block 508). Rolling back the network is described in more detail below.

If the packet pkt is received in the correct order (e.g., the packet pkt is the last packet in the history file) (block 506), the VSC 112 delivers the packet pkt to the VSN 126 for processing (block 510). The VSC 112 then updates the history with the most recent packet pkt (block 512). After the VSC 112 rolls back the network (block 508) or after the VSC 112 updates the history (block 512), the example instructions 500 may end. The instructions 500 may iterate to handle the next packet.

Figures 6, 7:
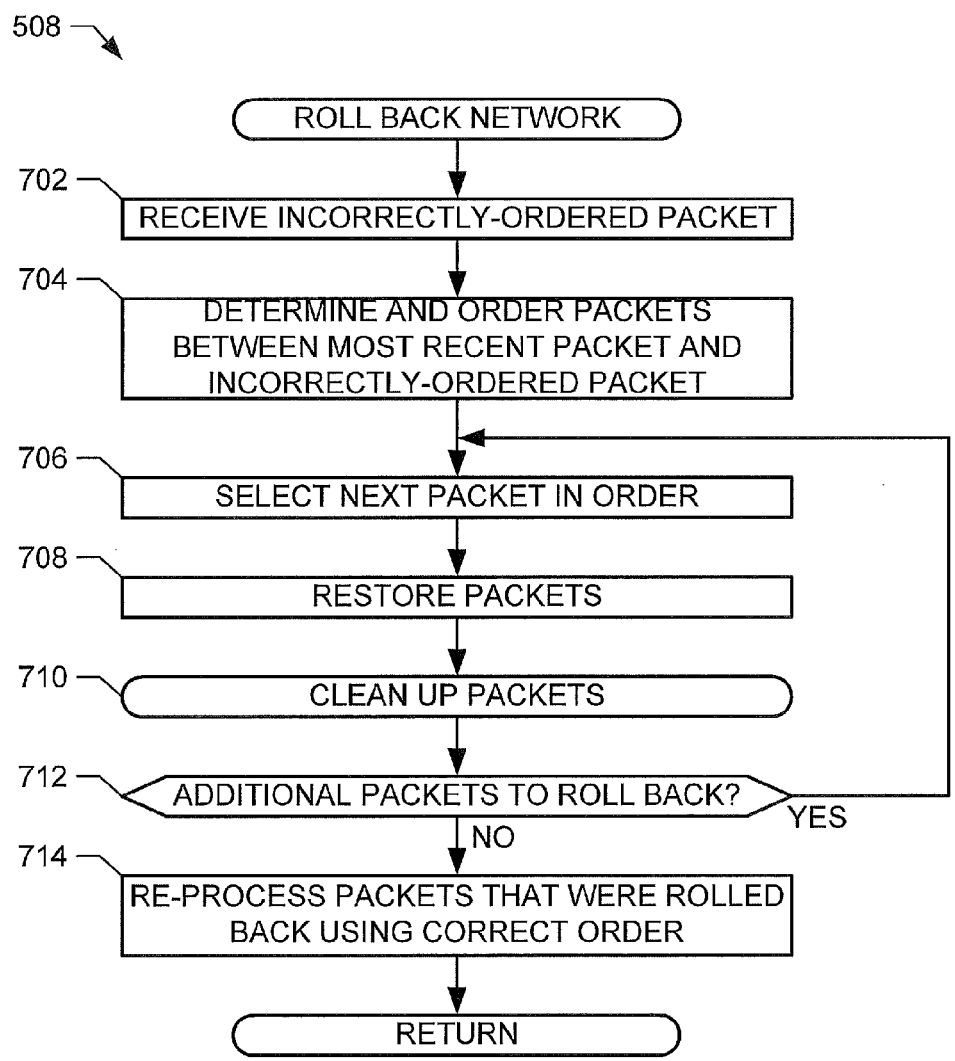
FIG. 6 illustrates pseudocode representative of example machine readable instructions that may be executed to implement the example process coordinator of FIG. 2 to roll back a network.
FIG. 7 is a flow diagram representative of machine readable instructions, which may be executed to implement the example process coordinator of FIG. 2 to roll back a network.

FIG. 6 illustrates pseudocode representative of example machine readable instructions 508 that may be executed to roll back a network. The execution of the instructions 508 will be described in combination with FIG. 7, which is a flow diagram representative of the example machine readable instructions represented by block 508 in FIG. 5. Thus, the example instructions 508 may be executed by the VSC 112 and one or more other VSCs as described below to implement line 3 of the example instructions 400 of FIG. 4 and/or block 508 of the example instructions 400 of FIG. 5. When the rollback function is invoked in a VSC 112, the calling function provides the history and the incorrectly-ordered packet pkt (block 702). Line 1 of the example instructions 508 determines the packets tpkt between the most recent packet (e.g., history.back) (inclusive) and the out-of-order packet pkt defined during the invocation of the rollback function (exclusive) and orders the packets from most recent to earliest according to the designated ordering (block 704).

The "for" function first selects the most recent packet as tpkt (block 706). Line 2 of the instructions 508 restores the state of the VSC 112 to a time prior to receiving the selected packet tpkt (block 708). This may be accomplished by, for example, restoring system variables, software, and/or other settings to their respective states prior to receiving the packet pkt as determined from a history file or log. Packets received by a VSC 112 (i.e., for use by the production VSN 126) often cause the VSC 112 to output other packets to other VSCs 114 and 120 (e.g., VSNs 128 and 130) in the production network 138. Thus, the VSC 112 determines the outputs generated by processing of the selected packet tpkt and invokes the cleanup function in line 3 to instruct the receiving VSCs 114 and/or 120 to reverse the effects of any packets that were sent to the VSCs 114 and/or 120 as a result of the packet tpkt (block 710). As described below with reference to FIGS. 8 and 9, the cleanup function may be recursive to clean up after packets having long causal chains. When the VSCs 114 and/or 120 have completed cleanup, the VSC 112 determines whether there are additional packets remaining (block 712). If there are additional packets through which the "for" loop must iterate (block 712), control returns to block 706 to select the next most recent packet as tpkt. The "for" loop iterates to restore the state and clean up after packets.

If there are no additional packets (block 712) (e.g., after restoring and cleaning up the out-of-order packet pkt), the VSNs 126-130 are in a state in which they should have been prior to receiving the packet pkt if the packets were received in the correct order. The VSC 112 then processes the packets in the correct order using the live_receive method (e.g., the instructions 400 of FIGS. 4 and 5) (block 714). When the VSC 112 has processed all the packets, the example instructions 508 may end and control returns to the example instructions 400 of FIG. 5.

Figures 8, 9:
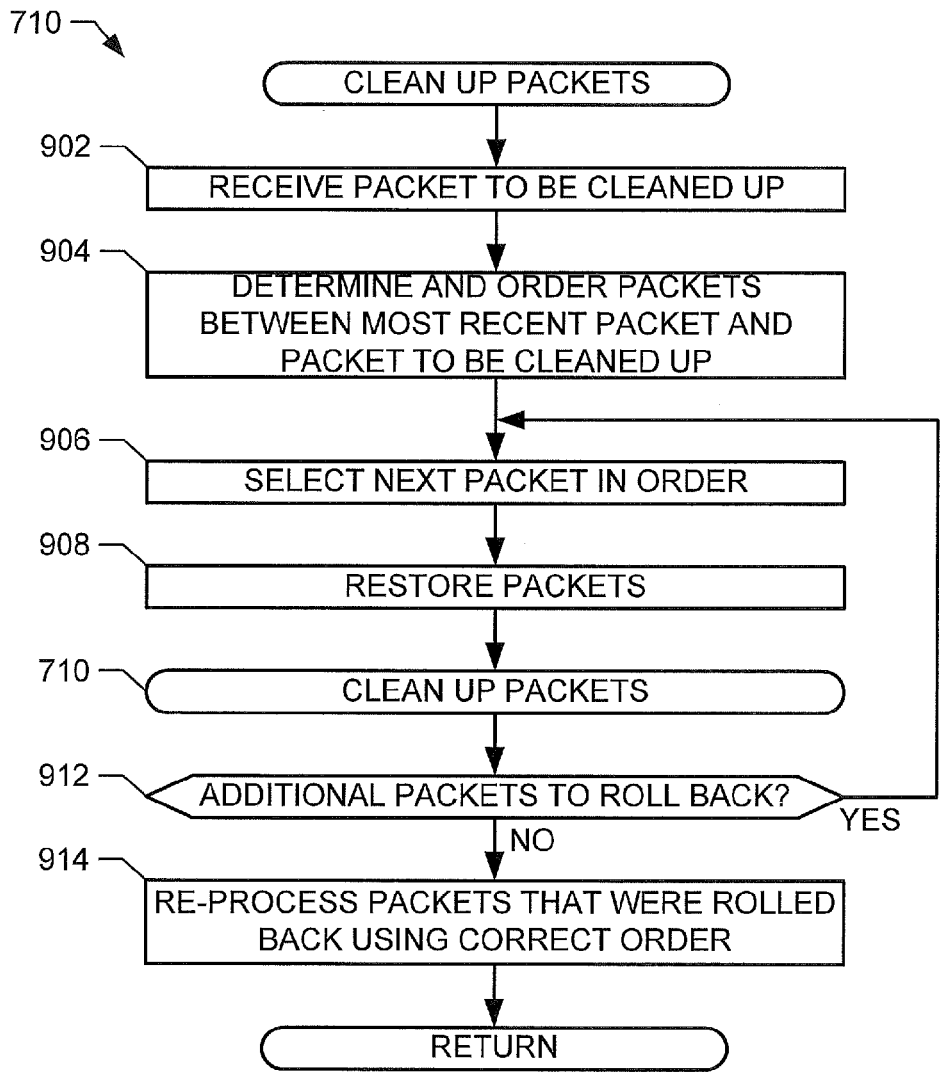
FIG. 8 illustrates pseudocode representative of example machine readable instructions that may be executed to implement the example process coordinator of FIG. 2 to clean up outputs from packets in a network.
FIG. 9 is a flow diagram representative of example machine readable instructions, which may be executed to implement the example process coordinator of FIG. 2 to clean up outputs from packets in a network.

FIG. 8 illustrates pseudocode representative of example machine readable instructions 710 that may be executed to clean up outputs from incorrectly-ordered packets in a network. The execution of the machine readable instructions 710 will be described in combination with FIG. 9, which is a flow diagram representative of the example instructions represented by block 710 in FIG. 7. The example instructions 710 may be invoked by the VSC 112 to be executed on other VSCs 114 and/or 120. For example, when the VSC 112 rolls back an out-of-order packet, the VSC 112 must also reverse the effects of output packets sent to other VSCs 114 and/120 as a result of intermediate packets that must be rolled back. An example is described below where the VSC 112 invokes the cleanup function to clean up a packet pkt output to another VSC 114.

When the cleanup function is invoked by the VSC 112, the VSC 112 provides the packet pkt to be cleaned up (block 902). Line 1 of the example instructions 710 determines the packets tpkt between the most recent packet (e.g., history. back( )) and the packet pkt to be cleaned up as defined during the invocation of the rollback function, and orders the packets from most recent to earliest according to the designated ordering (block 904).

The "for" function first selects the most recent packet as tpkt (block 906). Line 2 of the instructions 710 restores the state of the VSC 114 to a time prior to receiving the selected packet tpkt (block 908). The instructions then invoke the cleanup function 710 to clean up any packets output to the other VSCs 112 and 120 (i.e., VSNs 126 and 130) in the production network 138 as a result of the selected packet (block 710). The VSC 114 determines the outputs generated by processing of the selected packet tpkt and invokes the cleanup function in line 3 to instruct the receiving VSCs 112 and/or 120 to reverse the effects of any packets that were sent to the VSCs 112 and/or 120 as a result of the packet tpkt (block 710). As mentioned above, the cleanup function may be recursive to clean up after packets having long causal chains, causing the cleanup function to be executed or invoked on the VSCs 112, 114, and/or 120.

When the VSCs 112 and/or 120 have completed cleanup, the VSC 112 determines whether there are additional packets remaining (block 912). If there are additional packets through which the "for" loop must iterate (block 912), control returns to block 906 to select the next most recent packet as tpkt. The "for" loop iterates to restore the state and clean up after packets.

If there are no additional packets (block 912) (e.g., after restoring and cleaning up the packet pkt), the VSNs 126-130 are in a state in which they should have received the packet pkt if the packets were received in the correct order. The VSC 114 then processes the packets, not including the received packet pkt, in the correct order using the live_receive method (block 914). When the VSC 114 has processed all the packets, the example instructions 710 may end and control returns to the calling function, which may be a calling instance of the cleanup function or the rollback function.

Figure 10:
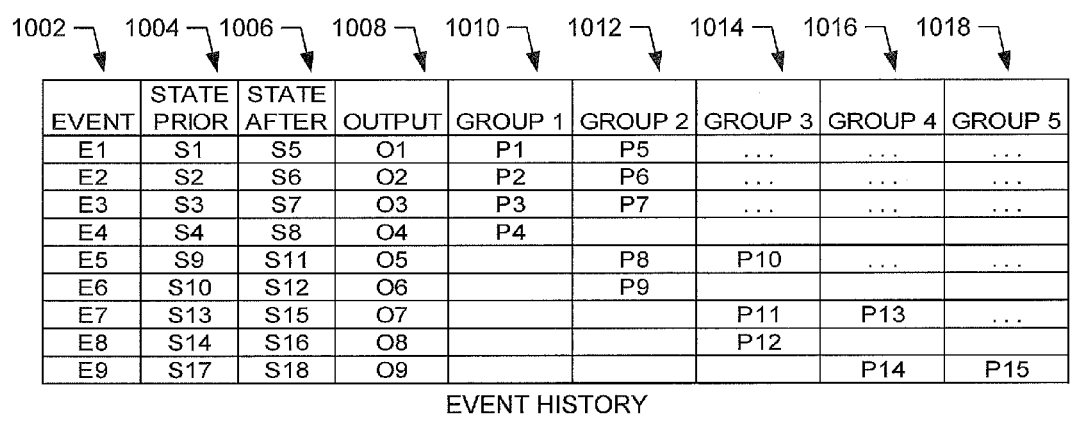
FIG. 10 is an example event history that may be used to implement the example communications system, the example virtual service coordinator, and/or the example debugging coordinator of FIGS. 1-3.

FIG. 10 is an example event history 1000 that may be used to implement the example communications system 100 and/or the example VSCs 112-120 of FIGS. 1-3. The example event history 1000 may be used to limit the number of rollback and cleanup function invocations that must be performed by the VSCs 112-120 to restore and/or clean up a packet having a long causal chain. For ease of discussion, the description of the event history 1000 of FIG. 10 will be described with reference to the example VSC 112 of FIG. 1, but any other use could likewise be implemented.

As illustrated in FIG. 10, the event history 1000 groups packets into events 1002 by causal relationship. Each event row represents a chain of packets that are causally linked. For example, the event E1 begins with a packet P1, which results in a packet P5, which in turn results in further packets. In grouping the packets by events, a VSC 112 can easily determine which packets to roll back.

The example event history 1000 further includes the "state prior" 1004 and the "state after" 1006 of the VSC 112. The state prior 1004 is the state (e.g., S1) of the VSC 112 immediately prior to the first packet (e.g., P1) of the associated event (e.g., E1). The state after 1006 is the state (e.g., S5) of the VSC 112 immediately after the final packet of the associated event E1. Thus, each event row represents a causal chain of packets. By tracking the states 1004 and 1006 of the VSC 112, the VSC 112 may be more easily rolled back by rolling back an event 1002 instead of recursively (e.g., one by one) rolling back the packets in a long causal chain. The event history 1000 also specifies the final output 1008 caused by an event 1002. For example, the event E1 results in an output O1. Using the example event history 1000, the live network 138 may be able to roll back a long chain of packets with one "roll back" call and one "cleanup" call.

In maintaining the event history 1000, the VSC 112 divides the timeline into groups 1010-1018. Each group represents a block of time. The event histories (e.g., the event history 1000) stored at each VSC 112-120 is synchronized so that the group number in one table represents the same block of time or that same group number in the other event tables. One of the VSCs 112-120 may be responsible for broadcasting the current group number to be used by the VSCs 112-120 in ordering events and packets. Because the histories are synchronized, broadcasting one group number causes all VSCs 112-120 receiving and responding to the group number to return to the same time state. A packet ordering may be imposed on each group 101.0-1018, and a rollback occurs if the packet ordering is violated within a group (e.g., 1010). Each VSC 112-120 monitors the most recent group number received and tags the packets triggering an event with the group number. While the packets after the triggering packet in an event are shown as associated with a group number in the example event history 1000 to show the causal relationships, packets (e.g., P5, P6, P7, P10, P13) subsequent to a triggering packet (e.g., P1, P2, P3, P4, P8, P9, P11, P12, and P14) do not need to be associated with a group 1010-1018.

Figure 11:
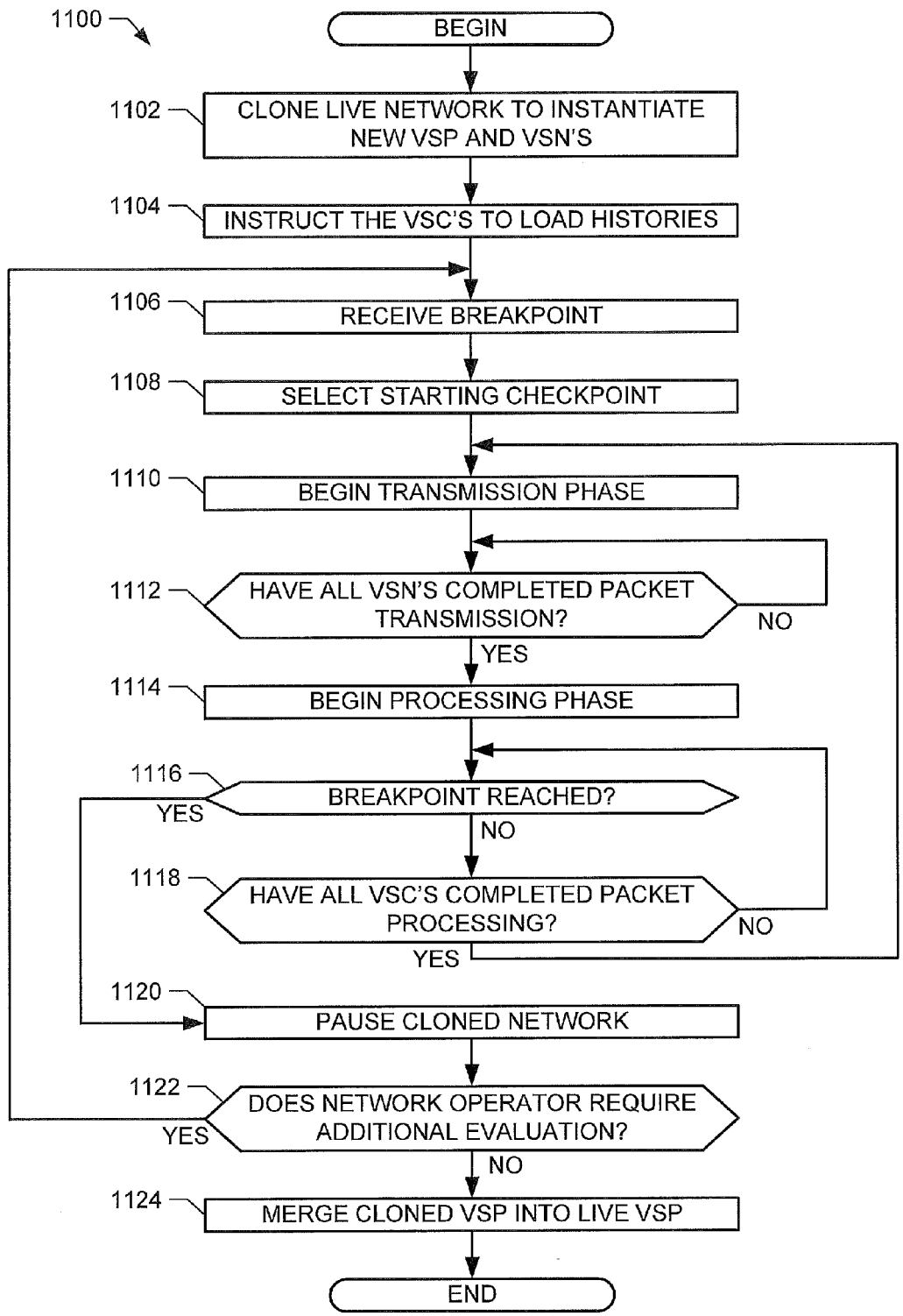
FIG. 11 is a flow diagram representative of example machine readable instructions, which may be executed to repair a network error.

FIG. 11 is a flow diagram representative of machine readable instructions 1100 which may be executed to repair a network error. The example instructions 1100 may be executed to implement the example debugging coordinator 142 of FIG. 1. To initiate the instructions 1100, a network operator accesses the debugging coordinator 142 after receiving a complaint or other notification of an issue with the communications network (e.g., the live network 138 of FIG. 1).

The debugging coordinator 142 clones the live network 138 to instantiate a cloned network, including a new VSP (e.g., the VSP 140 of FIG. 1) and sufficient VSNs 132-136 to represent at least the relevant VSNs 126-130 of the live network 138 (block 1102). Because the VSNs 126-136 are virtualized, the VSNs 132-136 may be instantiated on the same or different VSCs 112-120 as the VSNs 126-130. For clarity, this example will refer to the instantiation of the VSNs 132-136 on the VSCs 116-120 as illustrated in FIG. 1. Due to this virtualization, network debugging can proceed without interference with the operation of the live network. The debugging coordinator 142 instructs the VSCs 116-120 to load their respective histories (e.g., their respective versions of the event history 1000 of FIG. 10) (block 1104).

The debugging coordinator 142 receives a breakpoint determined by the network operator (e.g., via the user terminal 144) based on the suspected problem with the live network 138 (block 1106). In some examples, the debugging coordinator 142 will instruct appropriate VSCs 116-120 how to recognize a breakpoint. The network operator further inputs a starting checkpoint from which the debugging coordinator 142 will begin execution of the cloned network (block 1108). To run or execute the cloned VSP 140, the debugging coordinator 142 instructs the VSCs 116-120 to begin the transmission phase of execution (block 1110). In response, the VSCs 116-120 transmit any packets in their respective buffers to be output to other VSCs 116-120, and store any received packets in an incoming buffer. Processing of incoming packets does not occur during the transmission phase. The debugging coordinator 142 determines whether all VSCs 116-120 have completed transmission (block 1112). For example, each VSC 116-120 may notify the debugging coordinator 142 when it has completed transmission. If transmission is not complete (block 1112), control returns to block 1112 to continue monitoring for the end of transmission.

If transmission is complete for all of the VSCs 116-120 (block 1112), the debugging coordinator 142 instructs the VSCs 116-120 to begin the processing phase (block 1114). During the processing phase, the VSCs 116-120 process packets (if any) in their respective input buffers and generate output packets as appropriate. Processing the packets may include releasing the packets to be processed by the cloned VSNs 132-136. The generated output packets are not transmitted, but instead are queued in an output queue to be sent during the next transmission phase. The debugging coordinator 142, via messages from the VSCs 116-120, determines whether the breakpoint determined by the network operator has been reached (block 1116). If the breakpoint is not yet reached (block 1116), the debugging coordinator 142 determines whether all of the VSCs 116-120 have completed packet processing (block 1118). If the VSCs 126-130 have not completed packet processing (block 1118), control returns to block 1116 to continue the processing phase and determine whether the breakpoint was reached. However, if the VSCs 116-120 have completed processing (block 1118), control returns to block 1110 to begin a new transmission phase.

When a breakpoint specified by the network operator is reached (block 1116), the example debugging coordinator 142 pauses the cloned network 140 (block 1120). While the cloned network 140 is paused, the network operator may investigate the state of the cloned network 140 at any desired level of precision or abstraction. The network operator may determine a potential cause of the problem, may determine a potential fix for the problem, and/or may require more information. The debugging coordinator 142 determines whether the network operator requires additional evaluation (block 1122). If additional evaluation is required (block 1122), control returns to block 1106 to receive a new breakpoint. In some examples, the network operator may use the same breakpoint but select a new starting checkpoint (block 1108) or change the analysis in another way. If the network operator does not need additional information (block 1122), the debugging coordinator 142 merges the cloned VSP 140, including any changes, into the live network 138 to remove the corrected errors or bugs (block 1124). The example instructions 1100 then end.

Figure 12:
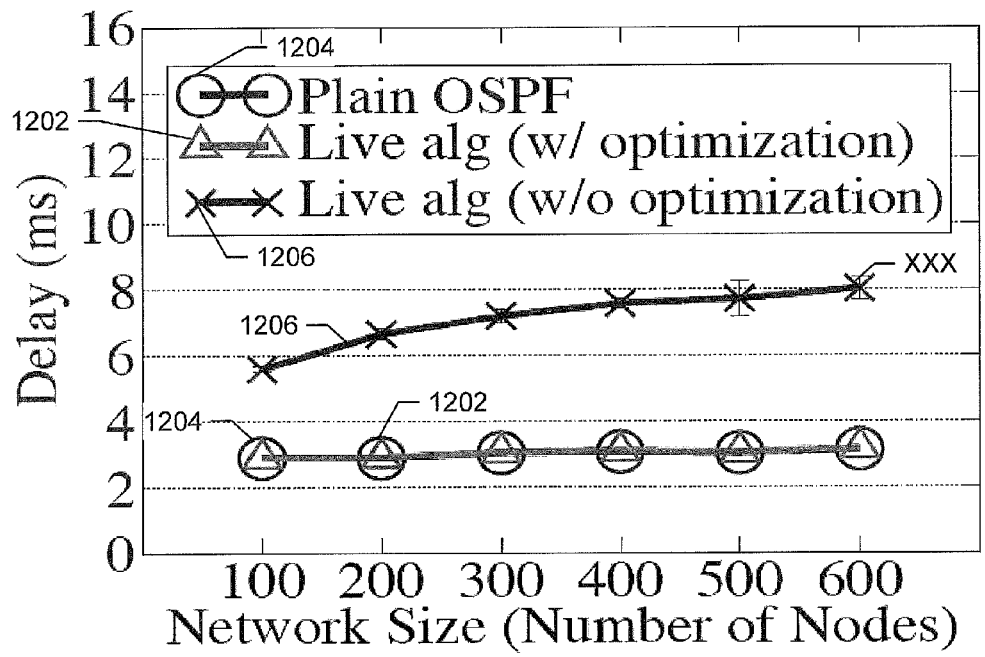
FIG. 12 is a diagram comparing convergence delays experienced by communication systems including the example communications system of FIG. 1.

FIG. 12 is a diagram comparing convergence delays 1202, 1204, and 1206 experienced by communication systems including the example communications system 100 of FIG. 1. The diagram also includes the delay 1204 of a plain OSPF network and the delay 1206 of a communication system implementing the live_receive, rollback, and cleanup algorithms without the ordering optimization described above. As illustrated, the delay 1202 of the example communications system 100 is comparable to the delay 1204 of the plain OSPF network (e.g., less than 3% additional delay compared to plain OSPF). However, without using the ordering optimization, the delay 1206 is substantial.

Figure 13:
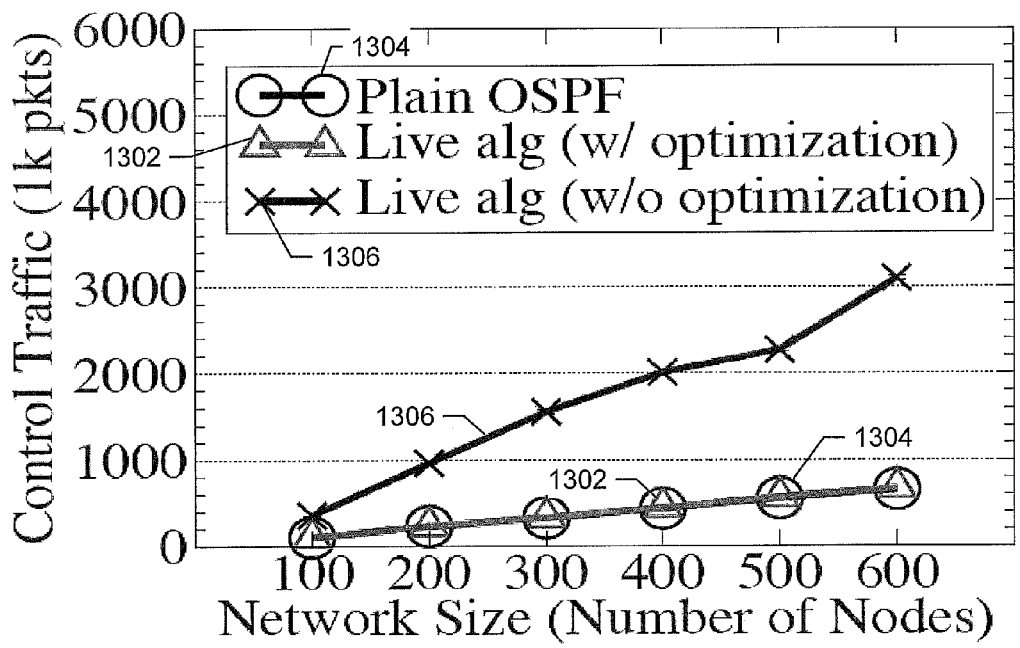
FIG. 13 is a diagram comparing the overhead traffic used by communication systems including the example communications system of FIG. 1.

FIG. 13 is a diagram comparing the overhead traffic 1302 used by communication systems including the example communications system 100 of FIG. 1. The diagram also includes the traffic 1304 of a plain OSPF network and the traffic 1306 of a communication system implementing the live_receive, rollback, and cleanup algorithms without the ordering optimization described above. As illustrated in FIG. 13, the overhead traffic 1302 for the example communications system 100 of FIG. 1 is very similar to (e.g., approximately 3% greater than) the traffic 1304 for the plain OSPF system. In contrast, the overhead traffic 1306 for the system that does not use the ordering optimization is significantly higher.

Figure 14:
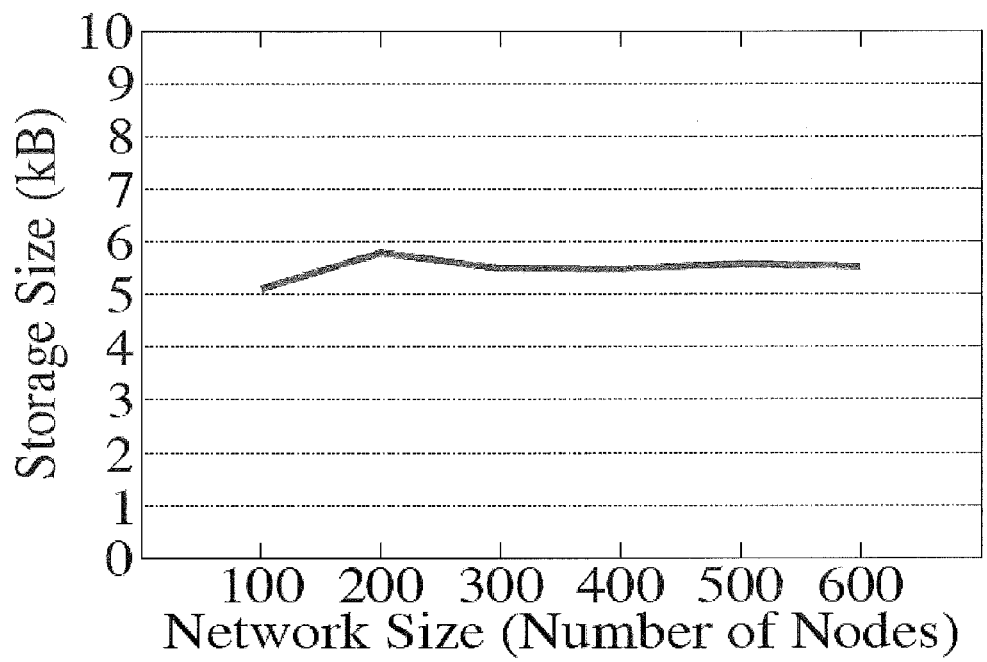
FIG. 14 is a diagram illustrating the storage needed to store the network history as a function of network size for the example communication system of FIG. 1.

FIG. 14 is a diagram illustrating the storage needed to store the network history as a function of network size for the example communication system 100 of FIG. 1. As illustrated in FIG. 14, the storage size requirements are relatively small and slightly increase as the number of nodes in the network increases. However, the storage size requirements easily fit within the random access memory available in routing equipment.

Figure 15:
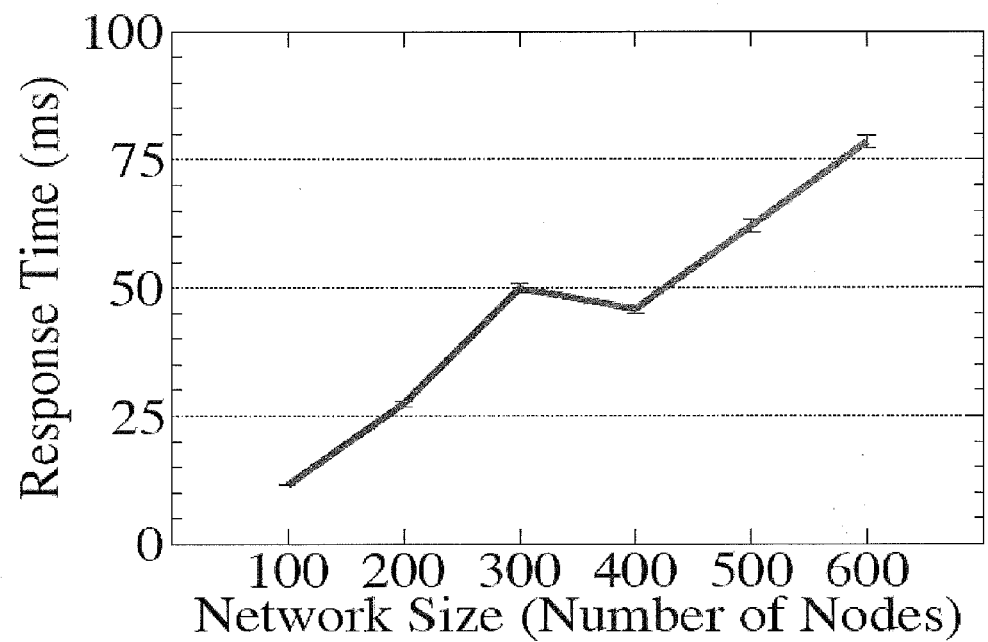
FIG. 15 is a diagram illustrating the debugging command response times as a function of network size for the example communications system of FIG. 1.

FIG. 15 is a diagram illustrating the debugging command response times as a function of network size for the example communications system 100 of FIG. 1. Specifically, FIG. 15 illustrates the response time to execute a single step command (e.g., begin transmission phase or begin processing phase). To support interactive debugging by a network operator, the communications system 100 has fast responses to operator commands (e.g., generally less than 100 milliseconds).

Figure 16:
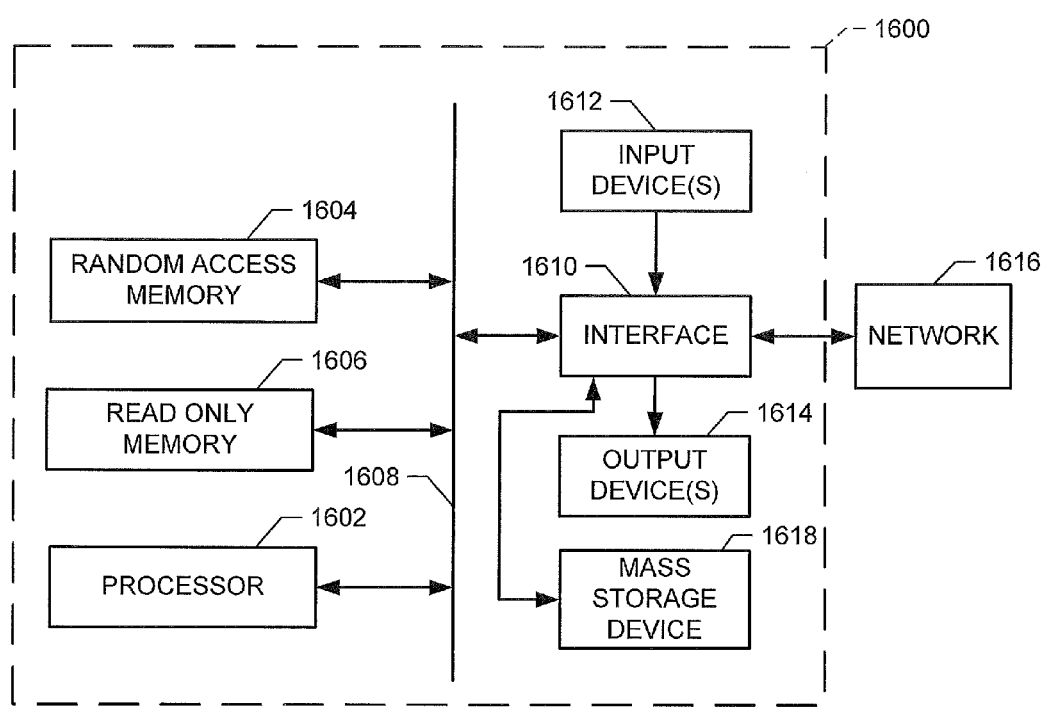
FIG. 16 is a block diagram of an example computing system that may be used to execute the example pseudocode and/or instructions 400, 508, 710, and 1100 of FIGS. 4-9 and 11, to implement the example network nodes, the example virtual service coordinators, the example debugging coordinator, the example user terminal, the example process coordinator, the example manager queue, the example network queue, the example backplane router, the example runtime managers, the example event queue, the example network state, the example debug translator, the example command queue, the example user interface, and/or, more generally, the example communications network 100 of FIGS. 1-3, and/or to implement the example methods and apparatus described herein.

FIG. 16 is a block diagram of an example processing system 160 that may execute example machine readable instructions represented by FIGS. 4, 5, 6, 7, 8, 9, 11, 12, 13, 14, and/or 15 to implement some or all of the example network nodes 102-110, the example VSCs 112-120, the example debugging coordinator 142, the example user terminal 144, the example process coordinator 202, the example manager queue 204, the example network queue 206, the example backplane router 208, the example runtime managers 210 and 212, the example event queue 302, the example network state 304, the example debug translator 306, the example command queue 308, the example user interface 310, and/or, more generally, the example communications network 100 of FIGS. 1-3. The processing system 1600 can be, for example, a server, a personal computer, a personal digital assistant (PDA), an Internet appliance, or any other type of computing device.

A processor 1602 is in communication with a main memory including a volatile memory 1604 and a non-volatile memory 1606 via a bus 1608. The volatile memory 1604 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1606 may be implemented by flash memory and/or any other desired type of memory device. Access to the main memory 1604, 1606 is controlled by a memory controller (not shown).

The processing system 1600 also includes an interface circuit 1610. The interface circuit 1610 may be implemented by any type of interface standard, such as an Ethernet interface, a universal serial bus (USB), and/or a third generation input/output (3GIO) interface.

One or more input devices 1612 are connected to the interface circuit 1610. The input device(s) 1612 permit a user to enter data and commands into the processor 1602. The input device(s) can be implemented by, for example, a keyboard, a mouse, a touchscreen, a track-pad, a trackball, isopoint and/or a voice recognition system.

One or more output devices 1614 are also connected to the interface circuit 1610. The output devices 1614 can be implemented, for example, by display devices, such as a liquid crystal display, a cathode ray tube display (CRT), a printer and/or speakers. The interface circuit 1610, thus, typically includes a graphics driver card.

The interface circuit 1610 also includes a communication device such as a modem or network interface card to facilitate exchange of data with external computers via a network 1616, such as an Ethernet connection, a digital subscriber line (DSL), a telephone line, coaxial cable, a cellular telephone system or any other network interface. The network 1616 may be implemented via the communications network 100 of FIG. 1.

The processing system 1600 also includes one or more mass storage devices 1618 for storing software and data. Examples of such mass storage devices 1618 include floppy disk drives, hard drive disks, compact disk drives and digital versatile disk (DVD) drives.

As an alternative to implementing the methods and/or apparatus described herein in a system such as the device of FIG. 16, the methods and/or apparatus described herein may alternatively be embedded in a structure such as processor and/or an ASIC (application specific integrated circuit).

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein may be stored on a tangible storage medium, such as: a magnetic medium (e.g., a magnetic disk or tape), a magneto-optical or optical medium (e.g., an optical disk), or a solid state medium (e.g., a memory card or other package that houses one or more read-only (non-volatile) memories, random access memories, or other re-writable (volatile) memories), or successor storage media to any of the above.

Although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, these examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A system comprising:
a user interface configured to receive commands from a user terminal;
a network interface communicatively coupled to a plurality of virtual service nodes via a communication network; and
processing logic configured to:
instantiate a cloned network that includes a second set of virtual service nodes that includes at least one cloned virtual service node that is a clone of a corresponding virtual service node in a first set of virtual service nodes of the plurality of virtual services nodes, wherein the at least one cloned virtual service node has access to a history of events that occurred at the corresponding virtual service node in the first set of virtual service nodes; and
initiate an interactive debugging session that includes step by step processing by the cloned network of the events of the history of events, wherein the step by step processing of the events starts at a first event of the history of events, wherein the step by step processing of the events includes sending a transmit command to each virtual service node in the second set of virtual service nodes, wherein the transmit command identifies a transmit phase, and wherein, during the transmit phase, each virtual service node in the second set of virtual service nodes is configured to transmit one or more packets associated with the first event.

2. The system of claim 1, wherein the one or more packets associated with the first event includes one or more packets transmitted during the first event by the corresponding virtual service node in the first set of virtual service nodes.

3. The system of claim 1, wherein each virtual service node in the second set of virtual service nodes is configured to receive one or more packets received during the first event at the corresponding virtual service node in the first set of virtual service nodes.

4. The system of claim 1, wherein the first event is identified by a checkpoint.

5. The system of claim 1, wherein a particular event in the history of events includes information related to a state of the corresponding virtual service node before the particular event, a state of the corresponding virtual service node after the particular event, an output of the particular event, one or more packets received during the particular event, and one or more packets transmitted during the particular event.

6. The system of claim 5, wherein each event in the history of events is ordered based on an order hierarchy that approximates an order in which the one or more packets were received at the corresponding virtual service node.

7. The system of claim 1, wherein the step by step processing of the events includes sending a processing command to each virtual service node in the second set of virtual service nodes upon completion of the transmit phase.

8. The system of claim 7, wherein the processing command identifies a processing phase, wherein, during the processing phase, each virtual service node in the second set of virtual service nodes is configured to process the one or more packets received during the first event.

9. The system of claim 8, wherein the processing logic is configured to:
determine whether a breakpoint that is associated with a condition of the communication network has been reached in response to completion of the processing phase; and
in response to a determination that the breakpoint has not been reached, sending a second transmit command and a second processing command to the second set of virtual service nodes, wherein the second transmit command and the second processing command are associated with a next event in the history of events.

10. The system of claim 1, wherein the processing logic is configured to:
modify a configuration of the cloned network in response to determining that a breakpoint has been reached; and
initiate a second interactive debugging session that includes step by step processing of the events of the history of events via the cloned network.

11. The system of claim 10, wherein modifying the configuration of the cloned network includes modifying a configuration of at least one cloned virtual service node in the cloned network.

12. The system of claim 11, wherein the processing logic is configured to merge the modified configuration into at least one virtual service node of the first set of virtual service nodes.

13. A method comprising:
instantiating a cloned network that includes a second set of virtual service nodes that includes at least one cloned virtual service node that is a clone of a corresponding virtual service node in a first set of virtual service nodes of a plurality of virtual services nodes, wherein the at least one cloned virtual service node has access to a history of events that occurred at the corresponding virtual service node in the first set of virtual service nodes; and
initiating an interactive debugging session that includes step by step processing by the cloned network of the events of the history of events, wherein the step by step processing of the events starts at a first event of the history of events, wherein the step by step processing of the events includes sending a transmit command to each virtual service node in the second set of virtual service nodes, wherein the transmit command identifies a transmit phase, and wherein, during the transmit phase, each virtual service node in the second set of virtual service nodes is configured to transmit one or more packets transmitted during the first event by the corresponding virtual service node in the first set of virtual service nodes and to receive one or more packets received during the first event at the corresponding virtual service node in the first set of virtual service nodes.

14. The method of claim 13, wherein a particular event in the history of events includes information related to a state of the corresponding virtual service node before the particular event, a state of the corresponding virtual service node after the particular event, an output of the particular event, one or more packets received during the particular event, and one or more packets transmitted during the particular event.

15. The method of claim 13, wherein the step by step processing of the events includes sending a processing command to each of the virtual service node in the second set of virtual service nodes upon completion of the transmit phase, wherein the processing command identifies a processing phase, wherein, during the processing phase, each virtual service node in the second set of virtual service nodes is configured to process the one or more packets received during the first event.

16. The method of claim 15, further comprising:
determining whether a breakpoint that is associated with a condition of the communication network has been reached in response to completion of the processing phase; and
in response to a determination that the breakpoint has not been reached, sending a second transmit command and a second processing command to the second set of virtual service nodes, wherein the second transmit command and the second processing command are associated with a next event in the history of events.

17. The method of claim 13, further comprising:
modifying a configuration of the cloned network in response to determining that a breakpoint has been reached; and
initiating a second interactive debugging session that includes step by step processing of the events of the history of events via the cloned network.

18. A non-transitory computer-readable storage medium comprising instructions that, when executed by a processor, cause the processor to:
instantiate a cloned network that includes a second set of virtual service nodes that includes at least one cloned virtual service node that is a clone of a corresponding virtual service node in a first set of virtual service nodes of a plurality of virtual services nodes, wherein the at least one cloned virtual service node has access to a history of events that occurred at the corresponding virtual service node in the first set of virtual service nodes; and
initiate an interactive debugging session that includes step by step processing of the events of the history of events, wherein the step by step processing of the events starts at a first event of the history of events, wherein the step by step processing of the events includes sending a transmit command to each virtual service node in the second set of virtual service nodes, wherein the transmit command identifies a transmit phase, and wherein, during the transmit phase, each virtual service node in the second set of virtual service nodes is configured to transmit one or more packets associated with the first event.

19. The non-transitory computer-readable storage medium of claim 18, wherein a particular event in the history of events includes information related to a state of the corresponding virtual service node before the particular event, a state of the corresponding virtual service node after the particular event, an output of the particular event, one or more packets received during the particular event, and one or more packets transmitted during the particular event.

20. The non-transitory computer-readable storage medium of claim 18, wherein the step by step processing of the events includes sending a processing command to each of the virtual service nodes in the second set of virtual service nodes upon completion of the transmit phase, wherein the processing command identifies a processing phase, wherein, during the processing phase, each virtual service node in the second set of virtual service nodes is configured to process the one or more packets received during the first event.

* * * * *